(12) United States Patent
Vaudreuil

(10) Patent No.: US 6,307,931 B1
(45) Date of Patent: Oct. 23, 2001

(54) SYSTEM AND METHOD FOR ALLOWING COMMUNICATION BETWEEN NETWORKS HAVING INCOMPATIBLE ADDRESSING FORMATS

(75) Inventor: Gregory M. Vaudreuil, Dallas, TX (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/100,260

(22) Filed: Jun. 19, 1998

(51) Int. Cl.$^7$ .................................................. H04M 7/00
(52) U.S. Cl. .................... 379/229; 379/220.01; 370/352; 370/401
(58) Field of Search ................................... 379/229, 230, 379/207.02, 219, 220.01; 370/352, 353, 389, 400, 401; 709/236, 238, 246, 313

(56) References Cited

U.S. PATENT DOCUMENTS

| | | | |
|---|---|---|---|
| 5,331,634 | * 7/1994 | Fischer | 370/405 |
| 5,363,369 | * 11/1994 | Hemmady et al. | 370/392 |
| 5,459,717 | * 10/1995 | Mullan et al. | 370/351 |
| 5,467,390 | * 11/1995 | Brankley et al. | 379/229 |
| 5,740,231 | * 4/1998 | Cohn et al. | 379/88.22 |
| 5,828,666 | * 10/1998 | Focsaneanu et al. | 370/389 |
| 5,896,504 | * 4/1999 | Shiraki | 709/206 |
| 5,940,478 | * 8/1999 | Vaudreuil et al. | 379/88.18 |
| 5,974,449 | * 10/1999 | Chang et al. | 709/206 |
| 6,069,890 | * 5/2000 | White et al. | 370/352 |
| 6,138,096 | * 10/2000 | Chan et al. | 704/235 |

FOREIGN PATENT DOCUMENTS

WO 96/38018  11/1996  (WO).
WO 97/16007   5/1997  (WO).

OTHER PUBLICATIONS

"Extending the IP Internet Through Address Reuse," by Paul F. Tsuchiya, Bellcore; and Tony Eng, MIT, Computer Communications Review, US, Association for Computing Machinery, New York, vol. 1 No. 23, Jan. 1, 1993, pp. 16–33, XP002075152, ISSN: 0146–4833, Relevant Pages: p. 17, line 10; p. 19, line 6; p. 24, line 12, line 18.

* cited by examiner

Primary Examiner—Ahmad Matar
Assistant Examiner—Benny Q. Tieu

(57) ABSTRACT

For use with a network having a limited address format, a system for, and method of, allowing the network to transmit a message to a non-compliant reply-to address without the network and a telecommunications infrastructure employing the same. In one embodiment, the system includes: (1) a compliant address generator that generates a spurious surrogate address employable within the network in lieu of the non-compliant reply-to address, the spurious surrogate address complying with the address format of the network and (2) a database manager, coupled to the compliant address generator, that stores a record containing the non-compliant reply-to address and the spurious surrogate address in an associated database to allow the non-compliant reply-to address to be substituted for the spurious surrogate address to permit the message to be transmitted to without the network.

21 Claims, 6 Drawing Sheets

SYSTEM AND METHOD FOR ALLOWING COMMUNICATION BETWEEN NETWORKS HAVING INCOMPATIBLE ADDRESSING FORMATS

TECHNICAL FIELD OF THE INVENTION

The present invention is directed, in general, to telecommunications and, more specifically, to a system and method for allowing communication between networks having incompatible addressing formats and a telecommunications infrastructure employing the same.

BACKGROUND OF THE INVENTION

Since the advent of telephone communications, callers have frequently failed to make contact with the individual they are calling either because that person is currently on another line, not in that location, or otherwise preoccupied. The resulting game of "phone tag" is both time and monetarily inefficient. The time and monetary costs are especially acute in the business environment as customers are faced with unanswered calls, extended waits on hold, unconveyed important information or the like.

In response to these problems, electronic voice and text messaging systems have been developed to provide a more reliable repository of messages. Voice messaging systems (VMSs), in particular, have proliferated in both residential and business use. In the residential context, VMSs may be as simple as an answering machine. In the business context, on the other hand, VMSs may be expensive and complex systems for use in telephone switching centers. VMSs are used to automate the answering of incoming calls from an external telephone network and the taking of messages when the extensions are not answered by the called parties. Individuals (senders), using standard dual tone multi-frequency (DTMF) phones may gain access to the VMS and create messages that are then addressed and sent to one or more select other users (recipients) of the system. Such voice messaging systems incorporate features, such as the recording of voice messages for users in what are known as "mailboxes." Additionally, access to the VMS may also be gained by users calling from private branch exchange (PBX) extensions or from a telephone network over incoming trunk lines to access their mailbox to listen to deposited voice messages.

Another popular and rapidly growing mechanism for transmission and receipt of messages involves the use of computers that are connected together in a network such as a local area network (LAN) or a wide area network (WAN). One of the most common applications for communication between users within a network, such as Internet, is electronic mail (e-mail). In its infancy, e-mail systems only handled text-based messages. Increasingly, e-mail applications are being enhanced to also support the transmission and receipt of information in other formats, e.g., graphics, facsimile and voice.

Internet telephony applications are becoming an attractive alternate for conventional telephony services, primarily because of the promise of substantial reduction in communication costs. Furthermore, there are a large number of applications and new multimedia capabilities available on the Internet. The Internet "telephone" with a computing device, e.g., a personal computer, often employing a packet-based technology, provides the caller with a greater flexibility and control as opposed to the traditional telephone devices.

The two examples of disparate communication networks discussed above, i.e., switched telephone networks and packet-based networks, currently employ different addressing schemes to distinguish between users within their network systems. For example, traditional VMSs use telephone number addressing to identify the sender and recipient of a message. Voice messaging protocols typically use only numeric telephone numbers to identify the originator and recipient and, as a consequence, most conventional voice mail systems commercially available provide support only for telephone number based addresses. On the other hand, a packet network application, such as Internet voice messaging (IVM), uses the existing Internet e-mail infrastructure to extend the reach of the voice mail community. Internet protocols employ mailbox names along with domain name system (DMS) addresses to identify an originator and recipient of a message uniquely.

Disparate identification schemes employed by different communication networks further exacerbate the problems encountered when responding to received messages from a different communication network. Not only is recognizing the originator of a message a problem if the receiving communication network does not support the originator communication network addressing format, but also identifying the reply-to address to facilitate a reply.

Accordingly, what is needed in the art is an improved method for permitting disparate communication networks to send and reply to messages thereamong.

SUMMARY OF THE INVENTION

To address the above-discussed deficiencies of the prior art, the present invention provides, for use with a network having a limited address format, a system for, and method of, allowing the network to transmit a message to a non-compliant reply-to address without (outside of) the network and a telecommunications infrastructure employing the same. In one embodiment, the system includes: (1) a compliant address generator that generates a spurious surrogate address employable within the network in lieu of the non-compliant reply-to address, the spurious surrogate address complying with the address format of the network and (2) a database manager, coupled to the compliant address generator, that stores a record containing the non-compliant reply-to address and the spurious surrogate address in an associated database to allow the non-compliant reply-to address to be substituted for the spurious surrogate address to permit the message to be transmitted to without the network.

For purposes of the present invention, a spurious surrogate address is a dissociated address that stands in for a real, but non-compliant address. "Dissociated" is defined as not corresponding to a real endpoint (which may be a telephone, terminal or mailbox). Dissociated addresses therefore include unassigned extensions in a given PBX or unassigned telephone numbers in a given area code, all telephone numbers in an unassigned exchange, area code or country code or any other string of characters or codes that does not correspond to an existing endpoint.

The present invention therefore introduces the broad concept of generating a spurious surrogate address that may or may not be based on the non-compliant reply-to address. This would allow communication between networks having incompatible addressing formats. More specifically, rendering a spurious surrogate address allows non-compliant addresses to be accommodated within a limited format network without requiring preregistration of the noncompliant addresses and without requiring the surrogate address to be a valid address. Legacy voicemail networks having restricted numeric address formats may therefore be able to accommodate replies to alphanumeric e-mail addresses or the like. For purposes of the present invention, "address" is broadly defined as an identifier for an originator or recipient of any form of communication.

In one embodiment of the present invention, the record contains a time stamp, the database manager deleting the record as a function of the time stamp. In a more specific embodiment, the database manager detects subsequent uses of the reply-to address and alters the time stamp in response thereto. The time stamp allows records to be preserved and purged as required. The preservation period may be fixed or selectable, and may apply network-wide or on a mailbox-class or mailbox-by-mailbox basis.

In one embodiment of the present invention, the network is a telephone network, the limited address format is a telephone number format and the non-compliant address is an Internet identifier such as an electronic mail address or a gatekeeper handle. In more specific embodiments, the telephone network may be a public switched telephone network (PSTN) or a private branch exchange (PBX). Three embodiments of the present invention will be illustrated and described in the Detailed Description that follows. Those skilled in the art will realize, however, that the present invention is fully applicable in adapting non-compliant addresses for use within a restricted-format network without requiring prior registration.

In one embodiment of the present invention, the spurious surrogate address complies with a dialing plan of the network. Alternatively, the spurious surrogate address may fall outside of the dialing plan. If the spurious surrogate address complies with the dialing plan, numbers or blocks of numbers may be required to be set aside for use as surrogate addresses.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
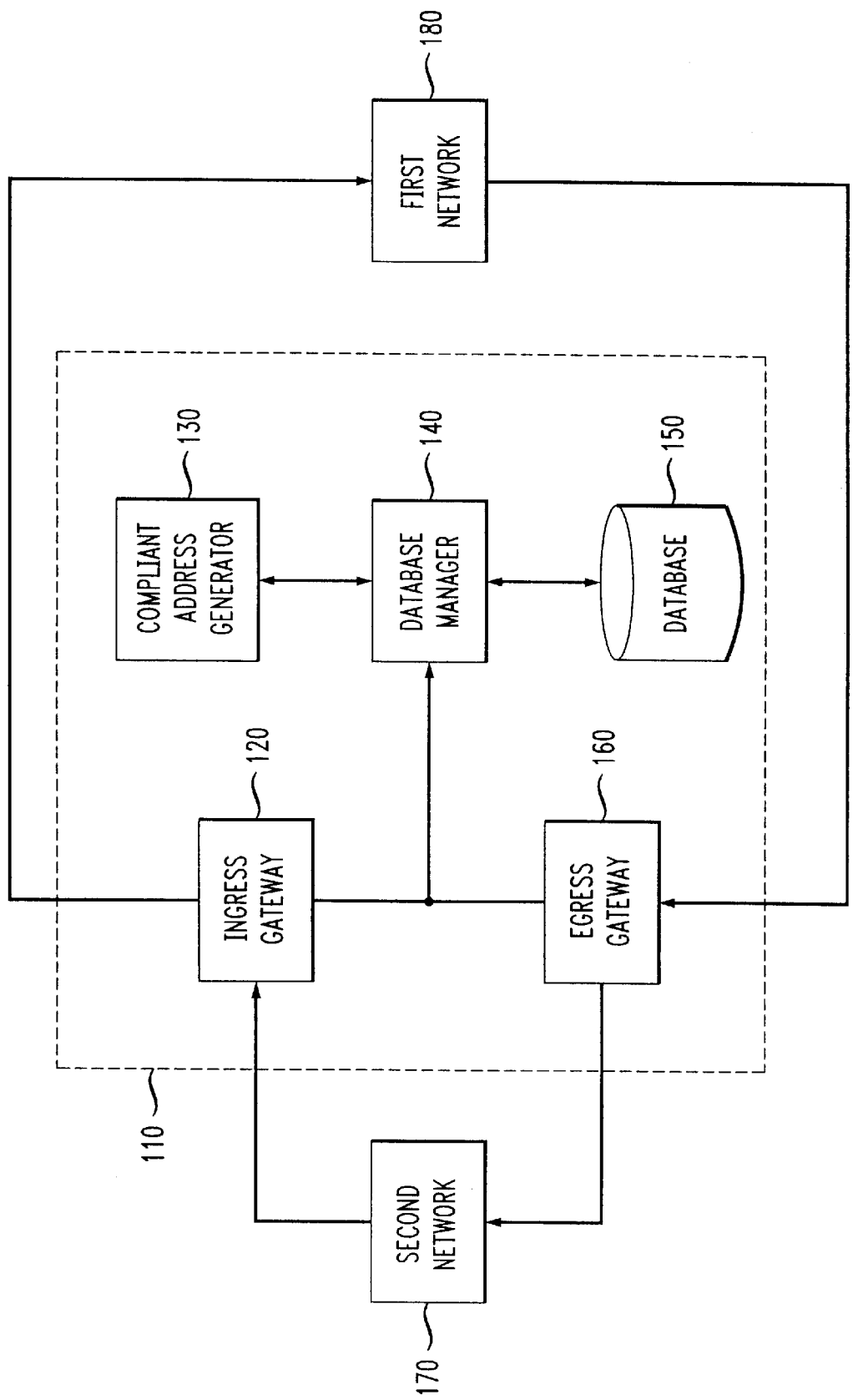
FIG. 1 illustrates a block diagram of an embodiment of a system 110 for allowing a first network 180 to communicate with another network with an incompatible address format constructed according to the principles of the present invention.

Referring initially to FIG. 1, illustrated is a block diagram of an embodiment of a system 110 for allowing a first network 180 to communicate with another network with an incompatible address format constructed according to the principles of the present invention. In the illustrated embodiment, the system 110 is shown coupled to first and second networks 170, 180. The system 110 includes an ingress gateway 120 that receives messages from the second network 170 that are destined for the first network 180. The system 110 also includes an egress gateway 160 that performs, among other things, the function of routing reply messages from the first network 180 to the second network 170. Both the ingress and egress gateways 120, 160 are coupled to a database manager 140 that is coupled to a database 150 and a compliant address generator 130. The operation of system 110 may be explained in greater detail by referring to FIGS. 2A and 2B with continuing reference to FIG. 1.

Figure 2A:
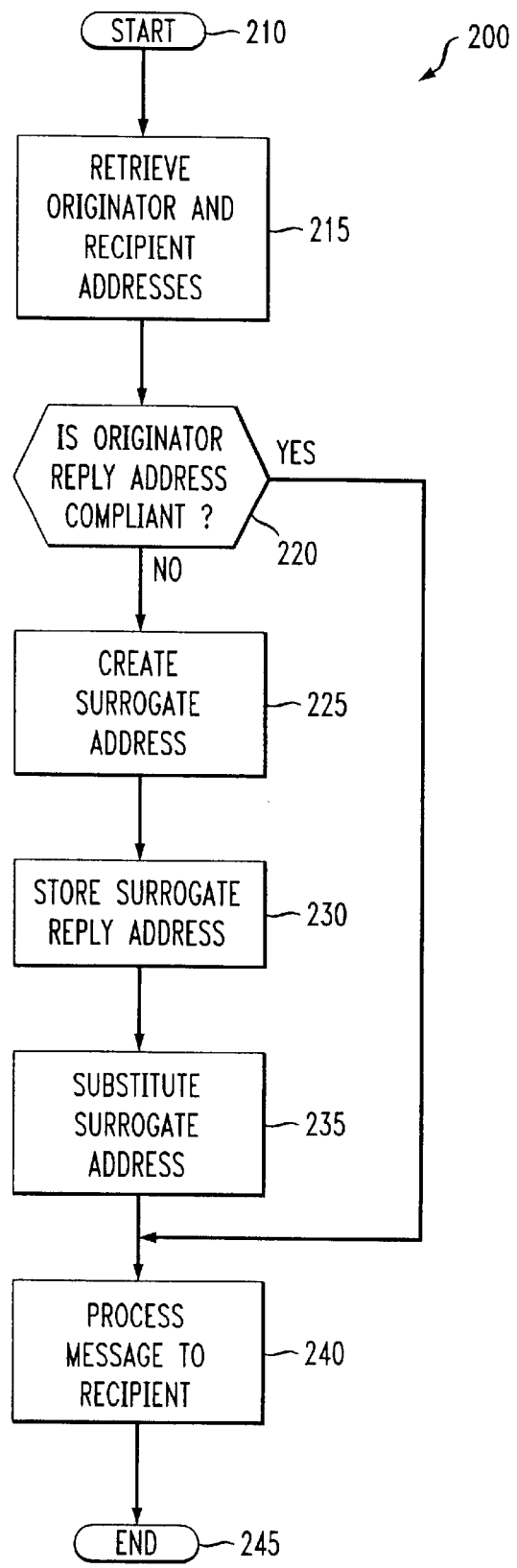
FIG. 2A illustrates an embodiment of a process flow wherein the system receives a message from the second network destined for the first network according to the principles of the present invention.
Figure 2B:
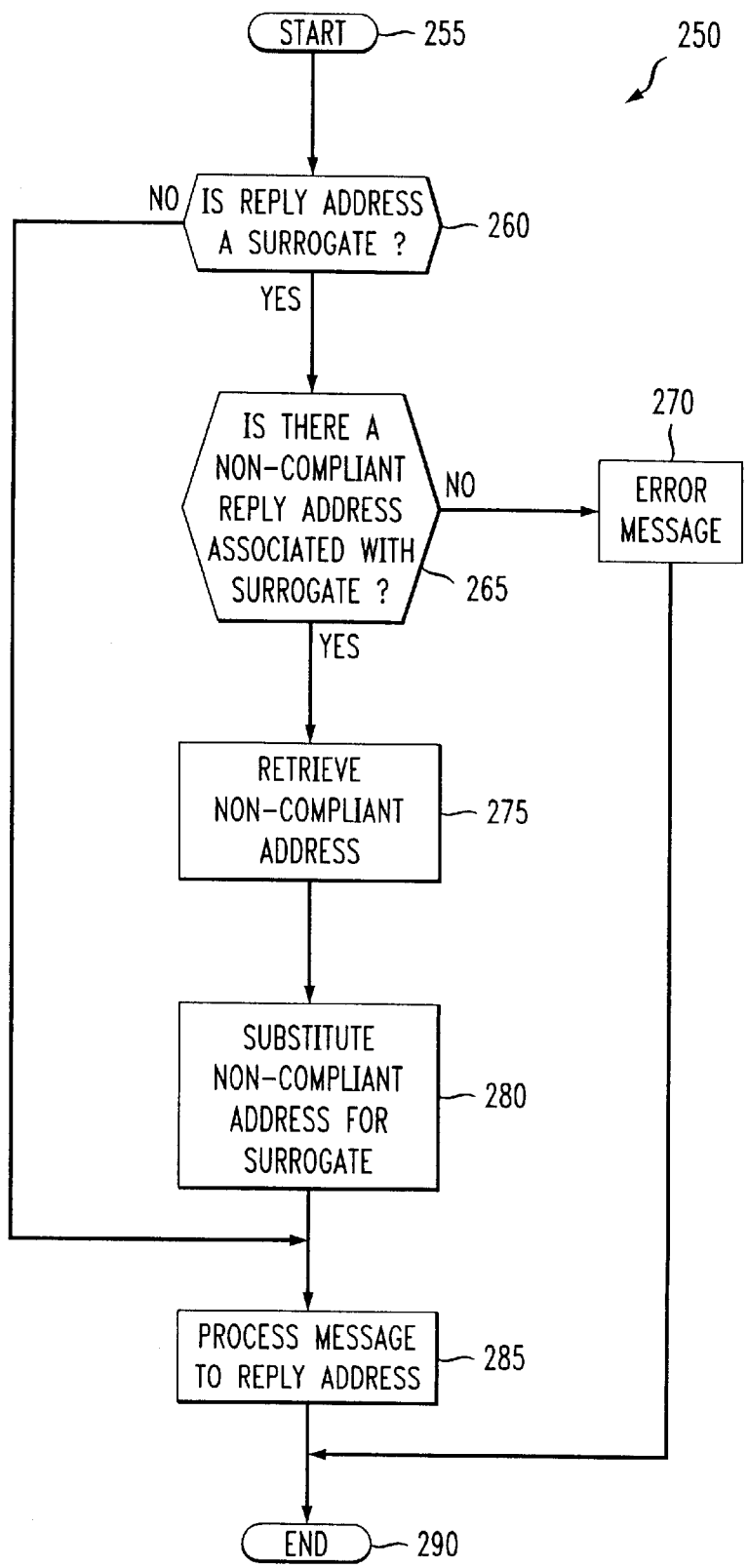
FIG. 2B illustrates an embodiment of a process flow wherein the system receives a reply message from the first network destined for the second network according to the principles of the present invention.

Turning now to FIGS. 2A and 2B, illustrated are flow diagrams of a method for allowing a network to transmit a message to a non-compliant reply-to address without the network constructed according to the principles of the present invention. Specifically FIG. 2A illustrates an exemplary process flow 200 wherein the system 110 receives a message from the second network 170 destined for the first network 180 according to the principles of the present invention. FIG. 2B illustrates an embodiment of a process flow 250 wherein the system 110 receives a reply message from the first network 180 destined for the second network 170 according to the principles of the present invention.

Turning first to process flow 200, the system 110 receives a message from the second network 170 (in a step 210). Following receipt of the message, the ingress gateway 120, in a step 215, determines the originator, i.e., the second network 170, and recipient, i.e., first network 180, addresses from the message. Those skilled in the art should readily appreciate that the determination of the originator and recipient addresses is generally based on the format of the message and/or the type of network from which the message originated from. Techniques and methodologies for accomplishing the above are well known in the art and will hereinafter not be described in detailed.

After the ingress gateway 120 has determined the originator's address, the process flow 200, in a decisional step 220, checks to see if the originator's reply-to address is in a format supported by the recipient. If the originator's reply-to address is in a format supported by the recipient, the ingress gateway 120 proceeds to process the message to the first network 180, in step 240. The process 200 then ends in step 245.

However, if the decisional step 220 determines that the originator's reply-to address is not supported by the recipient, the reply-to address is sent to the database manager 140, in step 225, to create a surrogate address (if necessary). For example, the first network 180 may be a Legacy voicemail network, in which case, the first network 180 may have a restricted numeric address format, e.g., ten digits numeric telephone number based format. However, if the second network 170 is an Internet-based network that only supports addressing schemes utilizing Internet fully qualified domain names (FQDN), e.g., gregv@lucent.com, the originator's reply-to address will be non-compliant with the restricted numeric format of the recipient.

In step 225, the database manager 140 compares the originator's reply-to address to a listing of non-compliant addresses that have surrogate addresses compatible for use in the first network 180. If there is already an existing surrogate address for the originator's reply-to address, the ingress gateway 120 is instructed to process the message to the recipient in the first network 180 after substituting the originator's reply-to address with its corresponding surrogate address. However, if the database manager 140 determines that the originator's reply-to address has no corresponding surrogate address in the database 150, the compliant address generator 130 is instructed to create one. Following the above example, the surrogate address formed is in a numeric telephone number format. It should also be noted that the created surrogate address, in an advantageous embodiment, is uniquely identifiable. For example, in the United States, the telephone dialing plan is based on a ten digit numeric code. In the first, or leftmost, digit, the number "1" is not used. Therefore, the surrogate address created may have the number "1" for its leftmost digit to distinguish the surrogate address from a compliant reply-to address. Those skilled in the art should readily appreciate that the above is only one example of an identification scheme and that other methods may also be advantageously employed in the practice of the present invention.

Following the creation of the spurious, surrogate address by the compliant address generator 130, the database manager 140 (in a step 230) proceeds to store a record of the originator's reply-to address and its corresponding surrogate address in the database 150. In a preferred embodiment, the stored record that contains the originator's reply-to address and its corresponding surrogate address also contains a time stamp of when the record was created. In another advantageous embodiment, the time stamp corresponds to when the message was received by the ingress gateway 120. The database manager 140 also provides the created surrogate address to the ingress gateway 120.

After receiving the surrogate address from the database manager 140, The ingress gateway 120 substitutes the originator's reply-to address with its corresponding surrogate address, in a step 235. Following the substitution of the non-compliant reply-to address with its compliant surrogate address, the ingress gateway 120 (in a step 240) processes the message with its surrogate reply-to address to the first network 180.

After delivery of the message from the second network 170 to the first network 180, the process 200 ends in step 245.

After receiving and reviewing the message from the second network 170, the recipient may decide to send a reply message to the originator. The process flow 250 for a reply message begins in a step 255 wherein a reply message is received by the egress gateway 160.

Following the receipt of a reply message from the first network 180, the egress gateway 160, in a decisional step 260, determines if the reply message contains a surrogate reply-to address. The egress gateway 160 accomplishes this by looking for the surrogate address unique identifier, e.g., the number "1" in the leftmost digit. If the reply-to address is not a surrogate address, the egress gateway 160 proceeds to process the message to the reply-to address in step 285. After the message has been sent by the egress gateway 160 to the second network 170, the process 250 ends in step 290.

On the other hand, if the egress gateway 160 determines that the reply-to address is a surrogate address, the process 250 proceeds to another decisional step 265 to determine if a non-compliant reply-to address is associated with the surrogate address. In the decisional step 265, the database manager 140 compares the supplied reply-to address with a listing of all surrogate addresses in the database 150.

If no corresponding surrogate address listing exists in the database 150, the egress gateway 160 is informed and an error message is generated, in step 270, to the first network 180. Various reasons exist why a surrogate address listing may not be present in the database 150. For example, in an advantageous embodiment, the database manager 140 periodically reviews the time stamps of the surrogate address records in the database 150 and purges any records if their time stamps in relation to the current time is greater than a predetermined period. In another related embodiment, different records relating to different recipients in the first network 180 may have different "purging" periods associated with them. In another advantageous embodiment, the period of time after which the records are removed are based on the identity of the originator, i.e., reply-to address. The reply message is then processed in accordance to the error handling scheme employed. The different types of error processing schemes that may be employed are not pertinent to the description of the present invention and will not herein be described in detail.

However, if there is a corresponding surrogate address listing in the database 150, the database manager 140 retrieves the stored record from the database and provides the non-compliant address associated with the surrogate address to the egress gateway 160, in step 275.

After receiving the non-compliant address from the database manager 140, the egress gateway 160 (in step 280) substitutes the surrogate address with the non-compliant address. Following the substitution, the egress gateway 160 proceeds to process the message to the reply-to address in the second network. The process 250 ends in step 290 after the message has been processed by the egress gateway 160.

The advantages and practice of the present invention may be further illustrated with the following examples. Those skilled in the art should readily appreciate, however, that the present invention is not limited to the following examples. The present invention is fully applicable in adapting non-compliant addresses for use within a restricted-format network without requiring prior registration.

Figure 3:
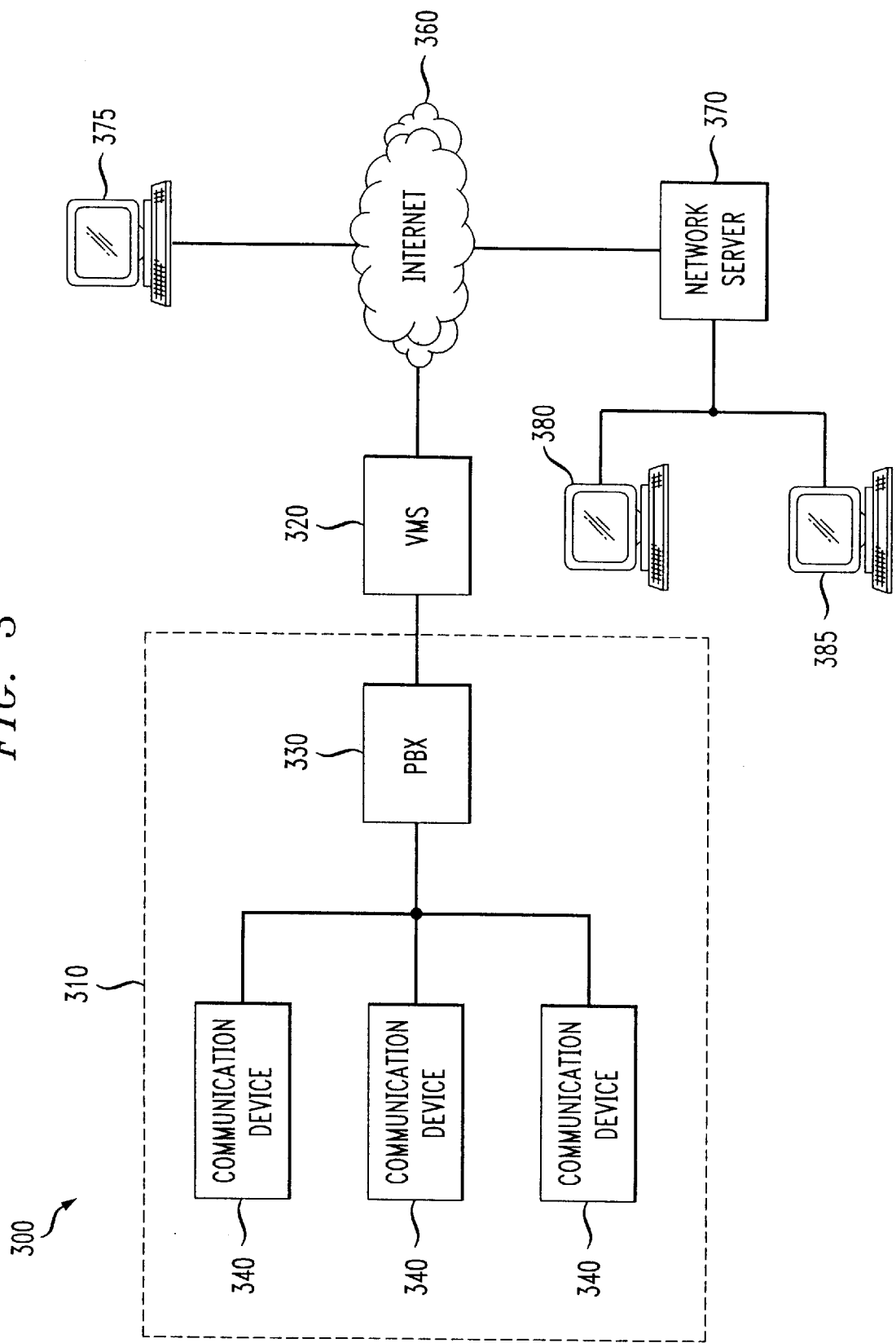
FIG. 3 illustrates a first embodiment of a telecommunications infrastructure that contains the system of FIG. 1 or carries out the method of FIG. 2 to permit communication of messages between a PBX network and the Internet.

Turning now to FIG. 3, illustrated is a first embodiment of a telecommunications infrastructure 300 that contains the system of FIG. 1 or carries out the method of FIG. 2 to permit communication of messages between a PBX network 310 and the Internet 360. The telecommunications infrastructure 300 includes a VMS 320 that is coupled to a PBX network 310. In another embodiment, the VMS 320 may be part of a network hub. A network hub is disclosed in U.S. Pat. No. 5,740,231, entitled "Network-Based Multimedia Communications and Directory System and Method of Operation," which is herein incorporated by reference in its entirety. The PBX network 310 includes a PBX 330 that is coupled to a plurality of communication devices (generally designated 340), e.g., telephones, answering machines and/or voice mailboxes.

In the illustrated embodiment, the VMS 320 is also shown coupled to the Internet 360. Also shown coupled to the Internet 360 are a first computer 375 and a network server 370. The network server 370, in an advantageous embodiment, is a file server on a LAN. Also shown as part of the LAN are second and third computers 380, 385.

The Internet 360 generally employs alpha-numeric e-mail addresses or FQDN to uniquely identify the first, second and third computers 375, 380, 385. The PBX network 330, on the other hand, generally employs a fixed format numeric addressing scheme to uniquely identify the each of the plurality of communication devices 340. The disparate addressing schemes contribute to the difficulty of responding to a message sent by the first computer 375 to a communication device within the PBX network 310 and vice versa. Within the telecommunication infrastructure 300, the system 110 illustrated in FIG. 1 or the method of FIGS. 2A and 2B may be advantageously employed in the VMS 320 to permit "seamless" communication between the two disparate addressing systems. Of course, the system 110 does not have to reside in the VMS 320, in other advantageous embodiments, the system 110 may reside within the Internet 360. It should be readily apparent to those skilled in the art that the different functions of the present invention, as described in FIG. 1, may also be distributed throughout the telecommunications infrastructure 300.

Figure 4:
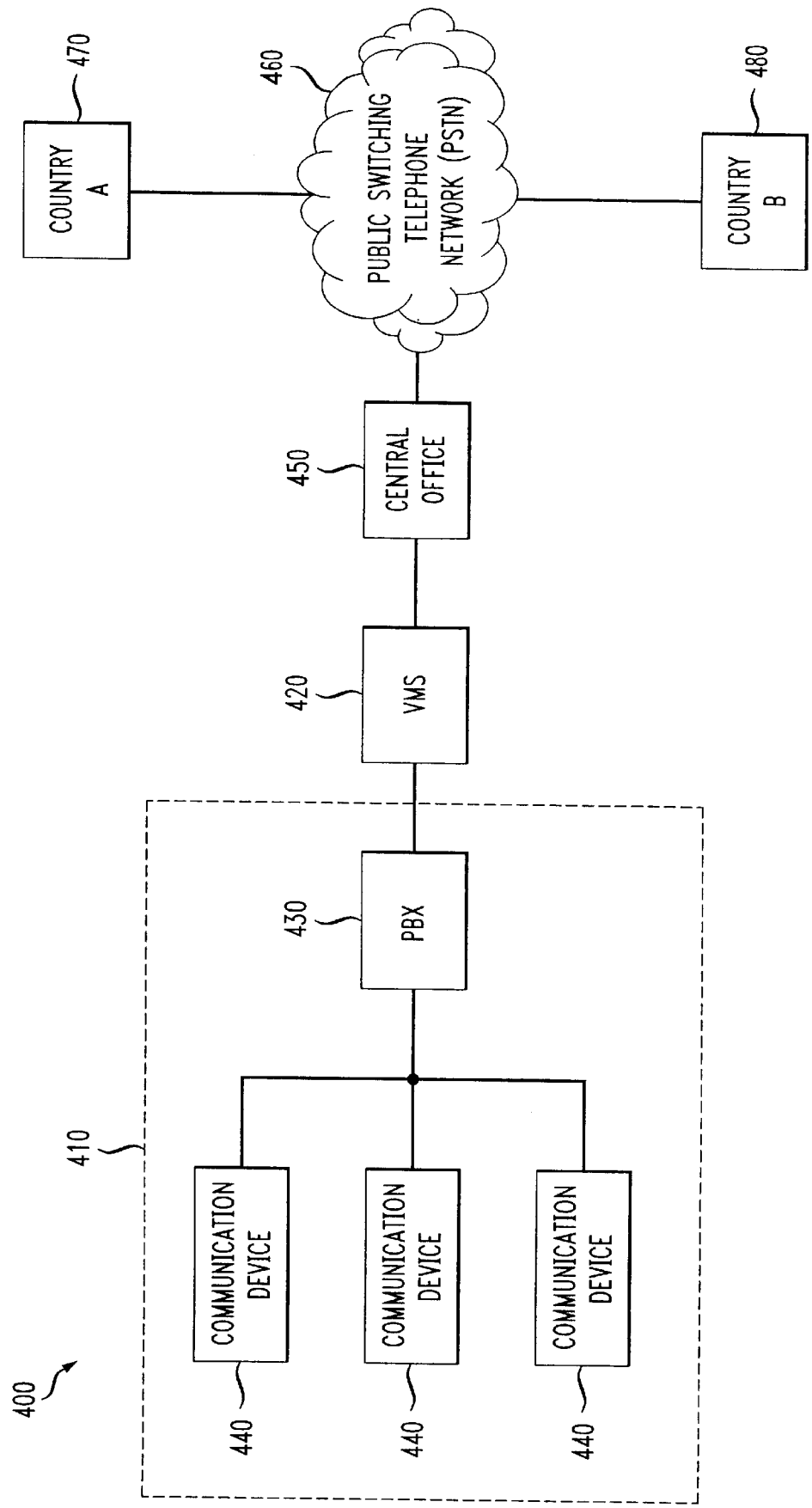
FIG. 4 illustrates a second embodiment of a telecommunications infrastructure that contains the system of FIG. 1 or carries out the method of FIG. 2 to permit communication of messages between a PBX network and an external telecommunications system.

Turning now to FIG. 4, illustrated is a second embodiment of a telecommunications infrastructure 400 that contains the system of FIG. 1 or carries out the method of FIG. 2 to permit communication of messages between a PBX network 410 and an external telecommunications system 460. The telecommunications infrastructure 400 includes a VMS 420 that coupled to a PBX network 410. As discussed previously, the VMS 420 may be part of a network hub. The PBX network 410 includes a PBX 430 that is coupled to a plurality of communication devices (generally designated 440), e.g., telephones, answering machines and/or voice mailboxes.

The VMS 420 is also shown coupled to a central office 450, such as a local area telephone access (LATA), that provides the VMS 420 an access to a public switched telephone network (PSTN) 460. In the illustrated embodiment, the PSTN 460 is also coupled to telephone systems in first and second countries 470, 480.

Although the PBX network 410 and the telephone systems in the first and second countries 470, 480 employ similar communication devices, e.g., telephones, all three systems may have different addressing schemes to uniquely identify different communication devices within each system. For example, the U.S. employs a ten digit numeric scheme to uniquely identify each communication address. However, other foreign countries may have smaller or larger numeric formats that cannot be represented in the U.S. format. This leads to difficulty in responding to a message received in the U.S. but originating from a foreign country and vice versa. In this illustration, the system 110 illustrated in FIG. 1 or the method of FIGS. 2A and 2B may be advantageously employed in the VMS 420 to permit "seamless" communication between the PBX network 410 and the different addressing methods employed by the first and second countries 470, 480. Of course, the system 110 does not have to reside in the VMS 420, in other advantageous embodiments, the system 110 may reside in the central office 450. It should be readily apparent to those skilled in the art that the different functions of the present invention, as described in FIG. 1, may also be distributed throughout the telecommunications infrastructure 400.

Figure 5:
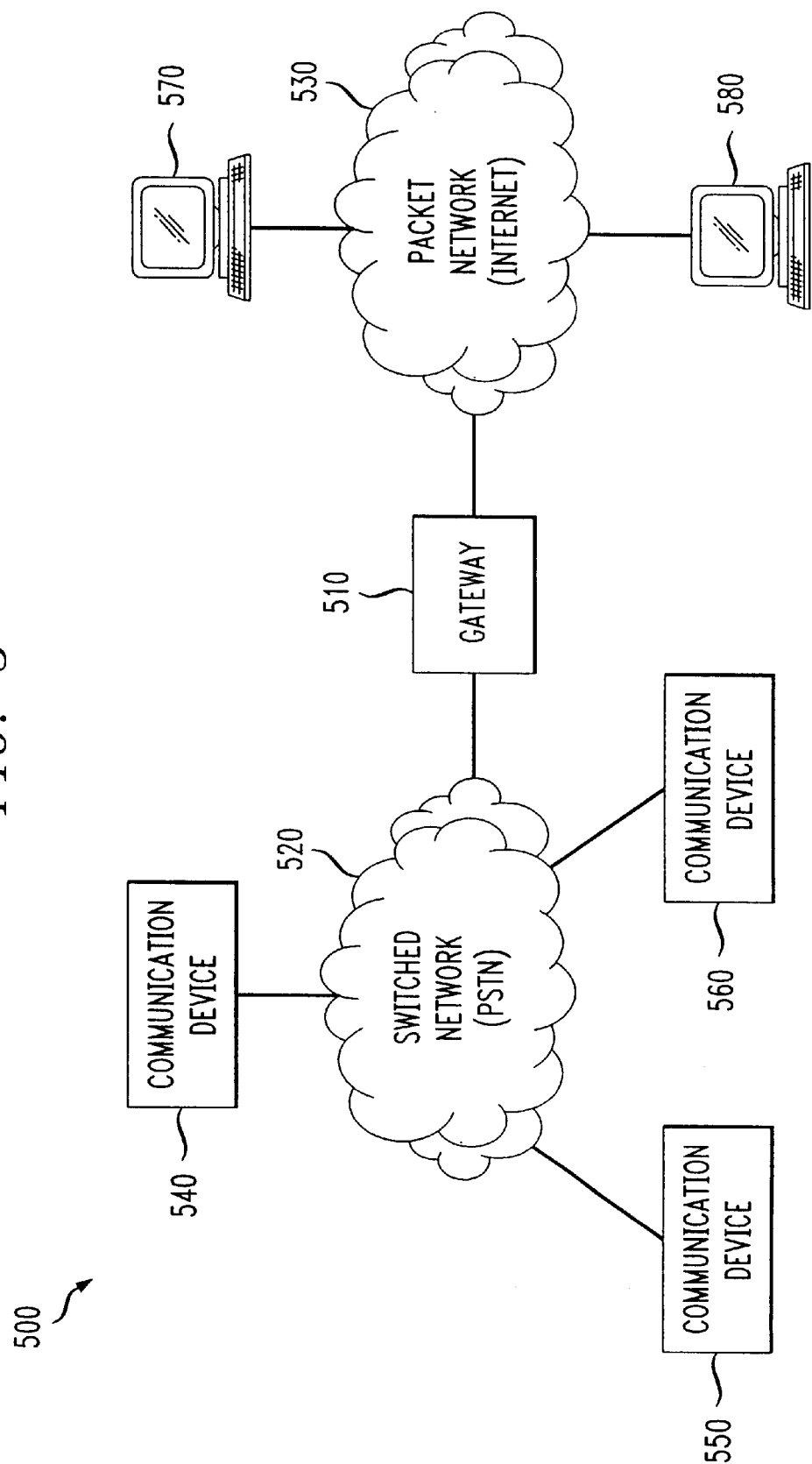
FIG. 5 illustrates a third embodiment of a telecommunications infrastructure that contains the system of FIG. 1 or carries out the method of FIG. 2 to permit communication of messages between a PSTN and the Internet.

Turning now to FIG. 5, illustrated is a third embodiment of a telecommunications infrastructure 500 that contains the system of FIG. 1 or carries out the method of FIGS. 2A and 2B to permit communication of messages between a PSTN 520 and the Internet 530. The telecommunications infrastructure 500 includes a gateway 510 that is coupled to both the PSTN 520 and the Internet 530. First, second and third communication devices 540, 550, 560, such as telephones, are shown coupled to the PSTN 520 while first and second computers 570, 580 are shown coupled to the Internet 530.

Typically, the PSTN 520 employs a restricted numeric addressing scheme to uniquely identify the first, second and third communication devices 540, 550, 560 that are part of it. On the other hand, the Internet 530 employs alpha-numeric addresses, such as an e-mail address or gatekeeper address, to uniquely identify the first and second computers 570, 580. Because of the disparate addressing schemes employed by the PSTN 520 and the Internet 530, if the first computer 570 sends a message to the second communication device 550 and the second communication device 550 responds with a reply message, the message may not be successfully delivered to the first computer 570. In this scenario, the system 110 illustrated in FIG. 1 or the method of FIGS. 2A and 2B may be advantageously employed in the gateway 510 to permit "seamless" communication between the two different addressing systems. Of course, the system 110 does not have to reside in the gateway 510, in other advantageous embodiments, the system 110 may reside in the Internet 530 and/or the PSTN 520. It should be readily apparent to those skilled in the art that the different functions of the present invention, as described in FIG. 1, may also be distributed throughout the telecommunications infrastructure 500.

Although the present invention has been described in detail, those skilled in the art should understand that they can make various changes, substitutions and alterations herein without departing from the spirit and scope of the invention in its broadest form.

What is claimed is:

1. For use with a first network having a limited address format, a system for allowing said first network to communicate with a second network with an incompatible address format, comprising:

a compliant address generator that generates a spurious surrogate address employable within said first network in lieu of a non-compliant reply-to address in said second network, said spurious surrogate address complying with said format but dissociated from addresses of said first network; and a database manager, coupled to said compliant address generator, that stores a record containing said non-compliant reply-to address and said spurious surrogate address in an associated database to allow said non-compliant reply-to address to be substituted for said spurious surrogate address to permit a message to be transmitted to said second network.

2. The system as recited in claim 1 wherein said record contains a time stamp, said database manager deleting said record as a function of said time stamp.

3. The system as recited in claim 2 wherein said database manager detects subsequent messages with said reply-to address and alters said time stamp in response thereto.

4. The system as recited in claim 1 wherein said first network is a telephone network, said limited address format is a telephone number format and said non-compliant address is an electronic mail address.

5. The system as recited in claim 4 wherein said telephone network is a public switched telephone network (PSTN).

6. The system as recited in claim 4 wherein said telephone network is a private branch exchange (PBX).

7. The system as recited in claim 1 wherein said spurious surrogate address complies with a dialing plan of said first network.

8. For use with a first network having a limited address format, a method of allowing said first network to communicate with a second network with an incompatible address format, comprising:

generating a spurious surrogate address employable within said first network in lieu of said non-compliant reply-to address in said second network, said spurious surrogate address complying with said format but dissociated from addresses of said first network; and storing a record containing said non-compliant reply-to address and said spurious surrogate address in an associated database to allow said non-compliant reply-to address to be substituted for said spurious surrogate address to permit a message to be transmitted to said second network.

9. The method as recited in claim 8 wherein said record contains a time stamp, said method comprising deleting said record as a function of said time stamp.

10. The method as recited in claim 9 further comprising:

detecting subsequent messages with said reply-to address; and altering said time stamp in response thereto.

11. The method as recited in claim 8 wherein said first network is a telephone network, said limited address format is a telephone number format and said non-compliant address is an electronic mail address.

12. The method as recited in claim 11 wherein said telephone network is a public switched telephone network (PSTN).

13. The method as recited in claim 11 wherein said telephone network is a private branch exchange (PBX).

14. The method as recited in claim 8 wherein said spurious surrogate address complies with a dialing plan of said first network.

15. A telecommunications infrastructure, comprising:

a first network having a limited address format;

a second network having an expanded address format that includes non-compliant addresses; and a system for allowing said first network to transmit a message to a non-compliant reply-to address in said second network, including:

a compliant address generator that generates a spurious surrogate address employable within said first network in lieu of said non-compliant reply-to address, said spurious surrogate address complying with said format but dissociated from addresses of said first network, and a database manager, coupled to said compliant address generator, that stores a record containing said non-compliant reply-to address and said spurious surrogate address in an associated database to allow said non-compliant reply-to address to be substituted for said spurious surrogate address to permit said message to be transmitted to said second network.

16. The infrastructure as recited in claim 15 wherein said record contains a time stamp, said database manager deleting said record as a function of said time stamp.

17. The infrastructure as recited in claim 16 wherein said database manager detects subsequent messages with said reply-to address and alters said time stamp in response thereto.

18. The infrastructure as recited in claim 15 wherein said first network is a telephone network, said limited address format is a telephone number format and said second network is a computer network.

19. The infrastructure as recited in claim 18 wherein said telephone network is a public switched telephone network (PSTN).

20. The infrastructure as recited in claim 18 wherein said telephone network is a private branch exchange (PBX).

21. The infrastructure as recited in claim 16 wherein said spurious surrogate address complies with a dialing plan of said first network.

\* \* \* \* \*